United States Patent
Lee et al.

(10) Patent No.: US 12,332,355 B2
(45) Date of Patent: Jun. 17, 2025

(54) IMAGE CAPTURING APPARATUS

(71) Applicant: SK hynix Inc., Icheon-si (KR)

(72) Inventors: Dong Jin Lee, Icheon-si (KR); Hyung June Yoon, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 533 days.

(21) Appl. No.: 17/705,026

(22) Filed: Mar. 25, 2022

(65) Prior Publication Data
US 2022/0326385 A1    Oct. 13, 2022

(30) Foreign Application Priority Data

Apr. 12, 2021    (KR) .......................... 10-2021-0046976

(51) Int. Cl.
| | | |
|---|---|---|
| *G01S 17/894* | (2020.01) | |
| *G01S 17/36* | (2006.01) | |
| *H04N 23/56* | (2023.01) | |

(52) U.S. Cl.
CPC ............ *G01S 17/894* (2020.01); *G01S 17/36* (2013.01); *H04N 23/56* (2023.01)

(58) Field of Classification Search
CPC ....... G01S 17/36; G01S 17/894; H04N 23/56; H04N 25/75
See application file for complete search history.

(56) References Cited

U.S. PATENT DOCUMENTS

| | | | |
|---|---|---|---|
| 2015/0206009 A1 | 7/2015 | Banno | |
| 2019/0086540 A1* | 3/2019 | Park | ................. G01S 17/894 |
| 2020/0284907 A1 | 9/2020 | Gupta et al. | |
| 2023/0417920 A1* | 12/2023 | Moriyama | ............ G01S 17/894 |

FOREIGN PATENT DOCUMENTS

| | | |
|---|---|---|
| CN | 106415312 A | 2/2017 |
| CN | 109959942 A | 7/2019 |
| CN | 111722204 A | 9/2020 |
| CN | 111868556 A | 10/2020 |
| KR | 20190071998 A | 6/2019 |

OTHER PUBLICATIONS

SiPMs in Direct ToF Ranging Applications. Semiconductor Components Industries, LLC Publication Order No. TND6254/D. Aug. 2021, Rev. 4. 17 pages.

(Continued)

*Primary Examiner* — Thanh Luu
(74) *Attorney, Agent, or Firm* — Perkins Coie LLP (57) ABSTRACT

An image capturing apparatus may include a first time of flight (ToF) sensor configured to calculate a distance to a target object using the time difference between a reference pulse time at which a modulated light signal is irradiated and a pulse sensing time at which a reflected modulated light signal, reflected from the target object and incident thereon, is sensed, a second ToF sensor configured to calculate the distance to the target object using a phase difference between the modulated light signal and the reflected modulated light signal, and a controller configured to enable any one of the first and second ToF sensors, based on first pixel data which the first ToF sensor generates to sense the reflected modulated light signal.

14 Claims, 9 Drawing Sheets

(56) References Cited

OTHER PUBLICATIONS

Churyumov, G. et al. "Microwave Energy and Light Energy Transformation: Methods, Schemes and Designs." IntechOpen, 2018, 19 pages.
Hansard, M. et al. "Time of Flight Cameras: Principles, Methods, and Applications." Springer, 2012, 103 pages.
Mochizuki, F. et al. "A multi aperture compressive time of flight CMOS imager for pixel wise coarse histogram acquisition." Research Institute of Electronics, Shizuoka University, 2015, 4 pages.
Panasonic. 3D sensing Solution: Technology. Retrieved on Mar. 18, 2022 from <https://b2bsol.panasonic.biz/semi-spt/apl/en/3d-tof/#technology_2>, 1 page.
Ranabhat, K. et al., "An Introduction to solar cell Technology." Journal of Applied Engineering Science vol. 14 article 405 pp. 481-491.
Vornicu, I. et al. "A CMOS Imager for Time-of-Flight and Photon Counting Based on Single Photon Avalanche Diodes and In-Pixel Time-to-Digital Converters." Romanian Journal of Information Science and Technology, vol. 17, No. 4, 2014, pp. 353-371.
First Office Action for CN Appl. No. 202210294328.3, mailed on Feb. 26, 2025, 19 pages with English translation.
Whyte, R. et al., "Application of lidar techniques to time-of-flight range imaging," Applied Optics, vol. 54, Issue 33, pp. 9654-9664 (2015), 12 pages.

\* cited by examiner

IMAGE CAPTURING APPARATUS

CROSS-REFERENCES TO RELATED APPLICATION

This patent document claims the priority and benefits of Korean application number 10-2021-0046976, filed on Apr. 12, 2021, which is incorporated herein by reference in its entirety.

TECHNICAL FIELD

Various embodiments generally relate to an image capturing apparatus including a sensor capable of sensing the distance to a target object based on a ToF (Time of Flight) method.

BACKGROUND

An image sensor refers to a semiconductor device for capturing and converting light of optical images into electrical signals for displaying the captured images and for further processing of the captured images. The development of various industries and sectors, including computer, automotive, medical and communication industries generates various demands for advanced image sensors in various devices and systems such as a smart phone, digital camera, game machine, IoT (Internet of Things), robot, security camera and medical micro camera.

One common type of image sensing devices is a charge coupled device (CCD), which has dominated the field of image sensors for a long time. Another common type of image sensing device is a complementary metal oxide semiconductor (CMOS) image sensing device. CCD image sensors offer a higher image quality and better noise characteristics than CMOS image sensors. However, CMOS image sensors are now widely used due to certain advantages over CCD image sensor, including, e.g., higher frame rates, shutter speed and various scanning methods. In addition, CMOS image sensors and signal processing circuitry can be integrated into a single chip, making it possible to miniaturize electronic devices while achieving low power consumption. Furthermore, using the CMOS fabrication technology can result in reduction in the production costs. Such characteristics make CMOS image sensors better suited for implementations in mobile devices.

SUMMARY

The embodiments of the disclosed technology relate to an image capturing apparatus that can be used to measure the distance between the image capturing apparatus and an object by changing operations modes.

In an embodiment of the disclosed technology, an image capturing apparatus may include a first time of flight (ToF) sensor configured to include first photosensing pixels to detect a modulated light signal and configured to process pixel signals from the first photosensing pixels to calculate a distance to a target object using a time difference between a reference pulse time at which the modulated light signal is irradiated to the target object and a pulse sensing time at which a reflected modulated light signal, reflected from the target object and incident thereon, is sensed by the first photosensing pixels, a second ToF sensor configured to include second photosensing pixels to detect the modulated light signal and configured to process pixel signals from the second photosensing pixels to calculate the distance to the target object using a phase difference between different signal segments of the modulated light signal and the reflected modulated light signal, and a controller coupled to the first and second ToF sensors and configured to enable one of the first and second ToF sensors for sensing the modulated light signal, based on first pixel data which the first ToF sensor generates in sensing the reflected modulated light signal.

In an embodiment of the disclosed technology, an image capturing apparatus may include a first time of flight (ToF) sensor configured to include first photosensing pixels to detect a modulated light signal and configured to process pixel signals from the first photosensing pixels to calculate a distance to a target object using a time difference between a reference pulse time at which a modulated light signal is irradiated to the target object and a pulse sensing time at which a reflected modulated light signal, reflected from the target object and incident thereon, is sensed by the first photosensing pixels, a second ToF sensor configured to include second photosensing pixels to detect the modulated light signal and configured to process pixel signals from the second photosensing pixels to calculate the distance to the target object using a phase difference between different signal segments of the modulated light signal and the reflected modulated light signal, and a controller coupled to the first and second ToF sensors and configured to enable one of the first and second ToF sensors for sensing the modulated light signal, based on first pixel data which the first ToF sensor generates in sensing the reflected modulated light signal.

In an embodiment of the disclosed technology, an image capturing apparatus may include a reference background-light offset (RBO) storage unit configured to store a reference BGL offset generated based on pixel data generated using sunlight as background light, and a controller configured to select one of a first operation mode and a second operation mode, using the reference BGL offset, wherein the first operation mode is a mode for calculating the distance to a target object, using a time difference between a modulated light signal irradiated onto a target object and a reflected modulated light signal which is reflected from the target object and incident on the image capturing apparatus, and the second operation mode is a mode for calculating the distance to the target object, using a phase difference between the modulated light signal and the reflected modulated light signal.

In an embodiment, an image capturing apparatus may include: a first ToF (Time of Flight) sensor configured to calculate a distance to a target object using the time difference between a reference pulse time at which a modulated light signal is irradiated and a pulse sensing time at which a reflected modulated light signal, reflected from the target object and incident thereon, is sensed; a second ToF sensor configured to calculate the distance to the target object using a phase difference between the modulated light signal and the reflected modulated light signal; and a controller configured to enable any one of the first and second ToF sensors, based on first pixel data which the first ToF sensor generates to sense the reflected modulated light signal.

In an embodiment, an image capturing apparatus may include: a reference background-light offset (RBO) storage unit configured to store a reference BGL offset (RBO) which is decided based on pixel data generated while background light is sunlight; and a controller configured to select one of a first operation mode and a second operation mode, using the reference BGL offset. The first operation mode may be a mode for calculating the distance to a target object, using a time difference between a modulated light signal irradiated onto a target object and a reflected modulated light signal which is reflected from the target object and incident on the image capturing apparatus, and the second operation mode may be a mode for calculating the distance to the target object, using a phase difference between the modulated light signal and the reflected modulated light signal.

Based on the present embodiments, the image capturing apparatus may select the optimal ToF method according to an image capturing environment, and sense the distance to an object.

Besides, it is possible to provide various effects which are directly or indirectly understood through this document.

DETAILED DESCRIPTION

Hereafter, various embodiments will be described with reference to the accompanying drawings. However, it should be understood that the present disclosure is not limited to specific embodiments, but includes various modifications, equivalents and/or alternatives of the embodiments. The embodiments of the present disclosure may provide various effects which can be directly/indirectly recognized through the present disclosure.

Figure 1:
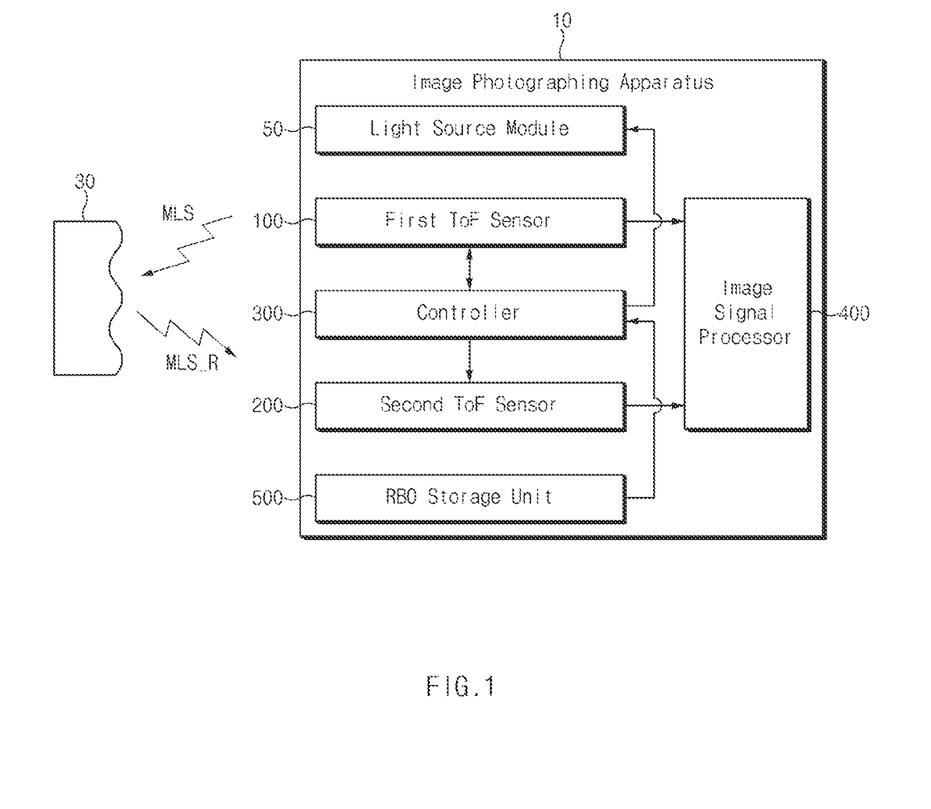
FIG. 1 is a diagram illustrating an example of an image capturing apparatus based on an embodiment of the disclosed technology.

FIG. 1 is a diagram illustrating an example of an image capturing apparatus based on an embodiment of the disclosed technology.

Referring to FIG. 1, the image capturing apparatus 10 may indicate an apparatus such as a digital still camera for capturing a still image or a digital video camera for capturing a video. For example, the image capturing apparatus 10 may be implemented as a DLSR (Digital Single Lens Reflect) camera, a mirrorless camera or a mobile phone (specifically, smart phone), but is not limited thereto. The concept of the image capturing apparatus 10 may include an apparatus which includes a lens and an image pickup element, and thus can generate an image by capturing an image of an object.

The image capturing apparatus 10 may include a light source module 50, a first ToF (Time of Flight) sensor 100, a second ToF sensor 200, a controller 300, an image signal processor 400 and an RBO (Reference Background-light Offset) storage unit 500 for storing RBO data. The image capturing apparatus 10 may measure a distance to a target object 30 by using the ToF principle to calculate the distance based on the time during which light irradiated from the image capturing apparatus 10 is reflected by the target object 30 and incident on the image capturing apparatus 10.

The image capturing apparatus 10 may have two kinds of modes, i.e. a first operation mode and a second operation mode according to the type of an enabled ToF sensor. The first operation mode in which the first ToF sensor 100 is enabled and the second ToF sensor 200 is disabled may indicate the mode in which the image capturing apparatus 10 measures the distance to the target object 30 using the first ToF sensor 100. The second operation mode in which the first ToF sensor 100 is disabled and the second ToF sensor 200 is enabled may indicate the mode in which the image capturing apparatus 10 measures the distance to the target object 30 using the second ToF sensor 200.

The light source module 50 may irradiate a modulated light signal (MLS) to the target object 30 in response to a control signal of the controller 300. Examples of the light source module 50 may include an LD (Laser Diode) or LED (Light Emitting Diode), an NIR (Near Infrared Laser), a point light source, a monochromatic illumination source and a combination of other laser sources. The LD or the LED emits a specific wavelength band of light (for example, infrared ray or visible light), and the monochromatic illumination source is configured by combining a white lamp and a monochromator. For example, the light source module 50 may emit infrared light having a wavelength of 800 nm to 1,000 nm. The modulated light signal MLS may be a light pulse signal which is modulated based on a predetermined modulation characteristic (for example, waveform, wavelength, period, amplitude, frequency, phase, duty rate or the like). Furthermore, the modulated light signal MLS may have different modulation characteristics in the first and second operation modes, respectively. For example, a pulse of the modulated light signal MLS irradiated in the first operation mode may have a larger amplitude than a pulse of the modulated light signal MLS irradiated in the second operation mode.

The first ToF sensor 100 may measure the distance to the target object 30 using a first ToF method, under control of the controller 300. In an embodiment, the first ToF method is a direct ToF method. According to the direct ToF method, the first ToF sensor 100 may calculate the distance to the target object 30 by directly measuring a reciprocation time and performing an operation on the reciprocation time and the speed of light, the reciprocation time indicating the time difference between the point of time that the modulated light signal MLS modulated with a predetermined modulation characteristic is irradiated to the target object 30 and the point of time that the modulated light signal MLS is reflected from the target object 30 and incident on the first ToF sensor 100.

The first ToF sensor 100 may be operated according to the control signal received from the controller 300. The first ToF sensor 100 may provide the controller 300 with pixel data which is generated during the process of calculating the distance to the target object 30. Furthermore, the first ToF sensor 100 may transmit the result, obtained by measuring the distance to the target object 30, to the image signal processor 400.

The second ToF sensor 200 may measure the distance to the target object 30 using a second ToF method, under control of the controller 300. In an embodiment, the second ToF method may be an indirect ToF method. According to the indirect ToF method, the second ToF sensor 200 calculates the distance to the target object 30 by irradiating the modulated light signal MLS modulated with the predetermined modulation characteristic to the target object 30, sensing a reflected modulated light signal MLS_R which is reflected from the target object 30 and incident thereon, and then calculating a phase difference between the modulated light signal MLS and the reflected modulated light signal MLS_R.

The second ToF sensor 200 may operate according to the control signal received from the controller 300. Furthermore, the second ToF sensor 200 may transmit the result, obtained by measuring the distance to the target object 30, to the image signal processor 400.

The controller 300 may perform overall control over the components included in the image capturing apparatus 10. Specifically, the controller 300 may select any one of the first and second operation modes as the operation mode of the image capturing apparatus 10, and enable the first or second ToF sensor 100 or 200.

The controller 300 may decide the operation mode of the image capturing apparatus 10 based on pixel data provided from the first ToF sensor 100 and an RBO provided from the RBO storage unit 500, and this process will be described below with reference to FIG. 6 and the following drawings.

The image signal processor 400 may collect the distance data for each pixel, inputted from each of the first and second ToF sensors 100 and 200, and generate a depth image indicating the distance to the target object 30. Furthermore, the image signal processor 400 may perform image signal processing on the generated depth image, in order to remove noise and to improve the quality of the image. The depth image outputted from the image signal processor 400 may be automatically stored in the image capturing apparatus 10 or an internal memory or external memory of a device having the image capturing apparatus 10 mounted therein or stored in the image capturing apparatus 10 or the internal memory or external memory according to a user's request, or displayed through a display. Alternatively, the depth image outputted from the image signal processor 400 may be used to control an operation of the image capturing apparatus 10 or the device having the image capturing apparatus 10 mounted therein.

The RBO storage unit 500 may be a database for storing an RBO corresponding to at least one light source type. RBO may indicate pixel data which are generated by the first ToF sensor 100 to sense background light in the same wavelength range as the modulated light signal MLS, and experimentally stored for each type of light. The first ToF sensor 100 may sense background light around the image capturing apparatus 10 even while the modulated light signal MLS is not generated, and generate pixel data corresponding to the intensity of the background light. The image capturing apparatus 10 may generate pixel data corresponding to the intensity of the background light while changing the background light at a test step, and the RBO storage unit 500 may store the generated pixel data as the RBO of the corresponding background light. For example, the background light may be sunlight.

Such an RBO may have a different value for each type of background light. Thus, the RBO may be used as information for identifying the background light. The controller 300 of the image capturing apparatus 10 based on the present embodiment may compare the information, acquired from the pixel data provided from the first ToF sensor 100, to the RBO provided from the RBO storage unit 500, identify the background light applied to the image capturing apparatus 10, and determine whether the image capturing apparatus 10 is located outdoor or indoor. When determining that the image capturing apparatus 10 is located outdoor, the controller 300 may operate the image capturing apparatus 10 in the first operation mode. On the contrary, when determining that the image capturing apparatus 10 is located indoor, the controller 300 may operate the image capturing apparatus 10 in the second operation mode.

In an outdoor area, sunlight may serve as major background light, and the distance between the image capturing apparatus 10 and the target object 30 may be relatively large due to the open area. In an indoor area, indoor light may serve as the major background light instead of sunlight, and the distance between the image capturing apparatus 10 and the target object 30 may be relatively small due to the closed area.

The first ToF sensor 100 may have relatively weak interference with sunlight, and a relatively large effective measurement distance. The effective measurement distance may indicate the maximum distance which can be substantially measured. On the other hand, the second ToF sensor 200 may have relatively strong interference with sunlight, and a relatively small effective measurement distance. Therefore, when the image capturing apparatus 10 is located outdoor, the image capturing apparatus 10 may operate in the first operation mode to enable the first ToF sensor 100 which is more suitable for an outdoor area. Furthermore, when the image capturing apparatus 10 is located indoor, the image capturing apparatus 10 may operate in the second operation mode to enable the second ToF sensor 200 which is more suitable for an indoor area.

Figure 2:
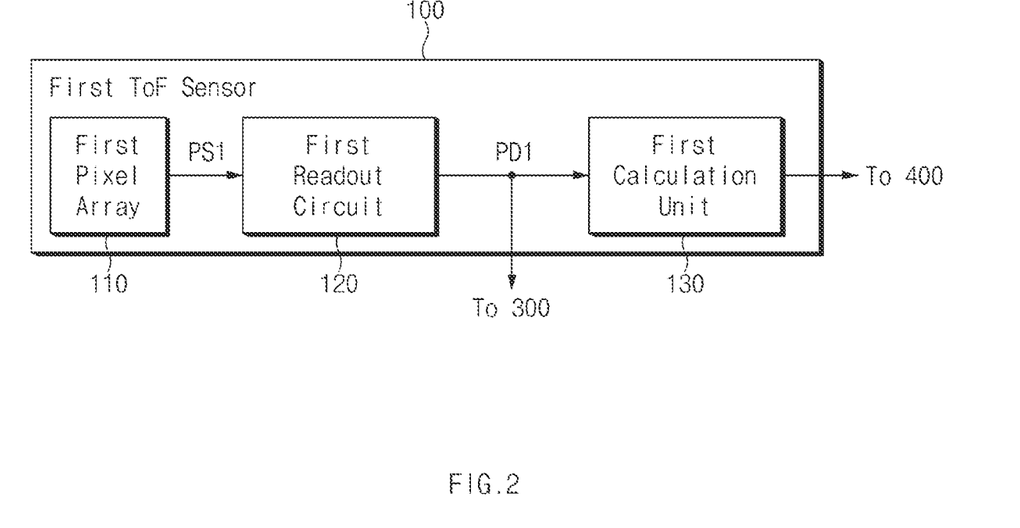
FIG. 2 is a block diagram illustrating an example of a first ToF sensor illustrated in FIG. 1.
Figure 3:
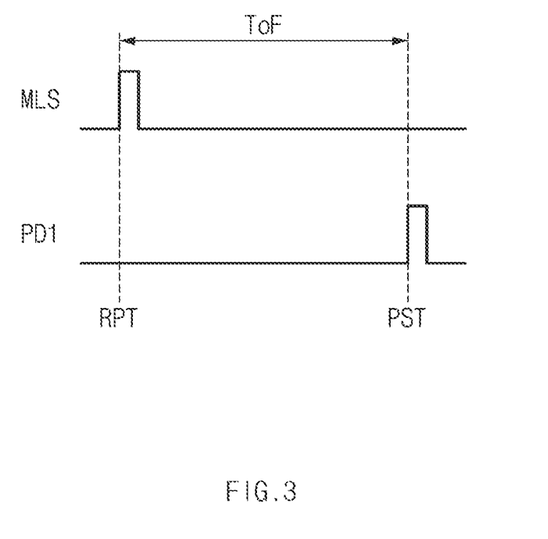
FIG. 3 is a timing diagram illustrating an example of how the first ToF sensor measures the distance between the image capturing apparatus and a target object.

FIG. 2 is a block diagram illustrating an example of the first ToF sensor illustrated in FIG. 1. FIG. 3 is a timing diagram illustrating an example of how the first ToF sensor measures the distance between the image capturing apparatus and a target object.

Referring to FIG. 2, the first ToF sensor 100 may include a first pixel array 110 of light sensing pixels for detecting the MLS from the light source module 50, a first readout circuit 120 coupled to receive output from the first pixel array 110 and a first calculation unit 130 that is coupled to receive the readout data from the first readout circuit 120.

The first pixel array 110 may include a plurality of first pixels which are successively arranged in a 2D matrix, for example, in column and row directions. Each of the first pixels is a light sensing pixel that may generate a first pixel signal PS1 as an electric signal corresponding to the intensity of the reflected modulated light signal MLS_R by photoelectrically converting the reflected modulated light signal MLS_R, received through a lens module (not illustrated), and output the generated first pixel signal PS1 to the first readout circuit 120. At this time, the first pixel signal PS1 may be a signal which indicates not the color of the target object 30 but information corresponding to the distance to the target object 30.

The lens module (not illustrated) may include a collecting lens and an optical filter. The collecting lens collects the reflected modulated light signal MLS_R reflected from the target object 30, and concentrates the collected light onto the first pixel array 110. The collecting lens may include a concentrating lens or positive lens formed from a suitable lens material including, e.g., a glass, plastic or other dielectric material, with a curved surface or in form of a cylindrical optical element. The collecting lens may include one or more lenses. The optical filter in the lens module is structured to selectively transmit light corresponding to the same wavelength range as the wavelength range of the modulated light signal MLS while blocking light at other wavelengths. Thus, the light incident on the first pixel array 110 may be limited to lights included in the wavelength range of the modulated light signal MLS, which makes it possible to suppress the generation of noise by light outside the wavelength range of the modulated light signal MLS such as the background light (BGL). This design of the optical filters for the TOF sensors is for capturing the reflected MLS light from an imaged object to measure the distance between the imaged object and the imaging device and thus is different from the color filtering designs for optical filters in the image sensing pixels for capturing color information in incident images.

In an embodiment, the collecting lens and the optical filter may be provided so as to correspond to each of the first pixels and thus different pairs of collecting lens and optical filters are provided for the different first pixels, respectively and for a spatially matching array of pairs of collecting lens and optical filters.

In an embodiment, each of the first pixels may be a direct pixel for the direct ToF method. Each of the first pixels may include a photoelectric conversion element configured to generate and accumulate photocharges corresponding to the intensity of incident light, and a pixel signal circuit configured to generate the first pixel signal PS1 corresponding to the quantity of photocharges.

For example, each of the first pixels may be an SPAD (Single-Photon Avalanche Diode) pixel. According to the operation principle of the SPAD pixel, an electric field is increased by applying a reverse bias voltage to an SPAD, and electrons generated by incident photons due to the strong electric field migrate to generate electron-hole pairs (impact ionization). Particularly, in an SPAD to operate in the Geiger mode in which a reverse bias voltage higher than a breakdown voltage is applied, innumerable carriers may be generated while carriers (electrons or holes) generated by incident light and electrons and holes generated by impact ionization collide with each other. Therefore, although a single photon is incident on the SPAD, the single photon may trigger avalanche breakdown to generate a measurable current pulse.

The first readout circuit 120 may generate first pixel data PD1 as digital data corresponding to the analog first pixel signal PS1 by processing the first pixel signal PS1 outputted from each of the first pixels. For example, the first readout circuit 120 may include an analog-to-digital converter for converting the first pixel signal PS1 into the first pixel data PD1.

The first readout circuit 120 may transmit the first pixel data PD1 to the first calculation unit 130 and the controller 300.

The first calculation unit 130 may calculate the time of flight from a reference pulse time provided from the controller 300 to a pulse sensing time decided by analyzing the first pixel data PD1, by comparing the reference pulse time to the pulse sensing time, calculate the distance between the target object 30 and the first ToF sensor 100 based on the calculated time of flight, and transmit the calculation result to the image signal processor 400. The reference pulse time may indicate the point of time that the modulated light signal MLS is irradiated, and the pulse sensing time may indicate the point of time that the reflected modulated light signal MLS_R reflected from the target object 30 and incident on the first ToF sensor 100 is sensed.

In implementations of the image capturing apparatus 10 in FIG. 1, the first and second TOF sensors 100 and 200 are configured differently and to operate or enabled for MLS sensing at different times while the light source module 50 is controlled to produce different modulated light signals to be detected by the first and second TOF sensors 100 and 200, respectively.

FIG. 3 is a timing diagram illustrating an example of how the first ToF sensor measures the distance between the image capturing apparatus and a target object. In some implementations, the first ToF sensor 100 can calculate a distance between the image capturing apparatus and a target object as will be discussed below.

Figure 5A:
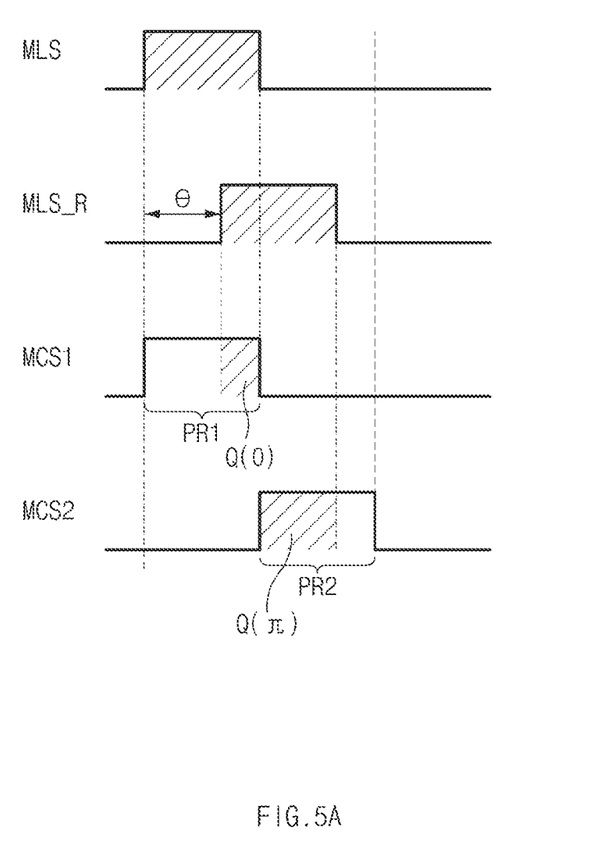
FIG. 5A is a timing diagram illustrating an example of how the second ToF sensor measures the distance between the image capturing apparatus and a target object.
Figure 5B:
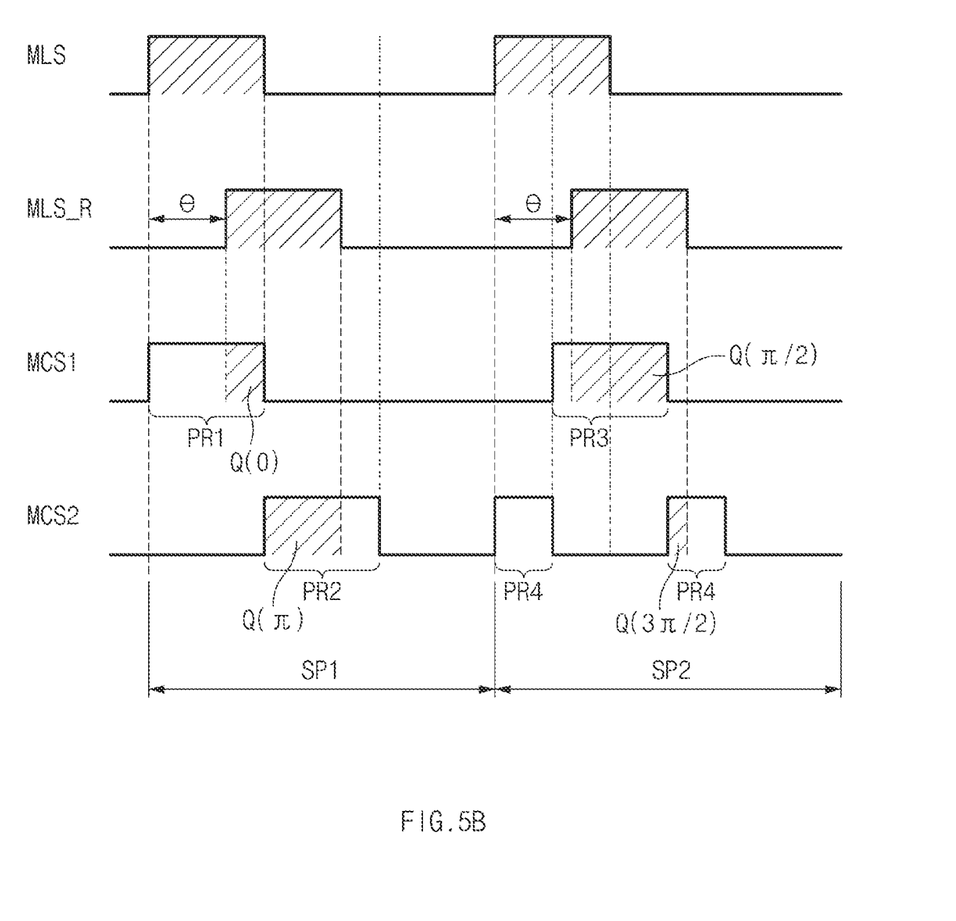
FIG. 5B is a timing diagram illustrating an example of how the second ToF sensor measures the distance between the image capturing apparatus and a target object.

Referring to light modulation signals shown in FIGS. 3, 5A and 5B, the modulated light signal MLS irradiated while the first ToF sensor 100 is enabled may have a pulse that has a larger amplitude and a smaller pulse width than that of the modulated light signal MLS irradiated while the second ToF sensor 200 is enabled, and the point of time that the pulse is generated may be defined and used as a reference pulse time RPT to determine the time of flight of the reflected MLS received by the first TOF sensor 100. The first calculation unit 130 may receive the control signal which the controller 300 applies to control the light source module 50 to send out the MLS and to set the reference pulse time RPT.

The first pixel array 110 and the first readout circuit 120 may generate the first pixel data PD1 by sensing the reflected modulated light signal MLS_R which is reflected from the target object 30 and incident on the first ToF sensor 100.

The first calculation unit 130 may analyze the first pixel data PD1 to determine the arrival of a reflected pulse in the reflected MLS at a time known as a pulse sensing time (PST) which is the point of time that the first pixel data PD1 has a value equal to or more than threshold data to represent the presence of the reflected pulse.

The first calculation unit 130 may calculate the distance between the target object 30 and the first ToF sensor 100 by calculating the time of flight corresponding to the time difference between the reference pulse time RPT and the pulse sensing time PST, and performing an operation on the calculated time of flight and the speed of light to obtained the distance (e.g. multiplying the speed of light by a value obtained by dividing the time of flight by 2 due to the round trip traveled by the MLS light).

Figure 4:
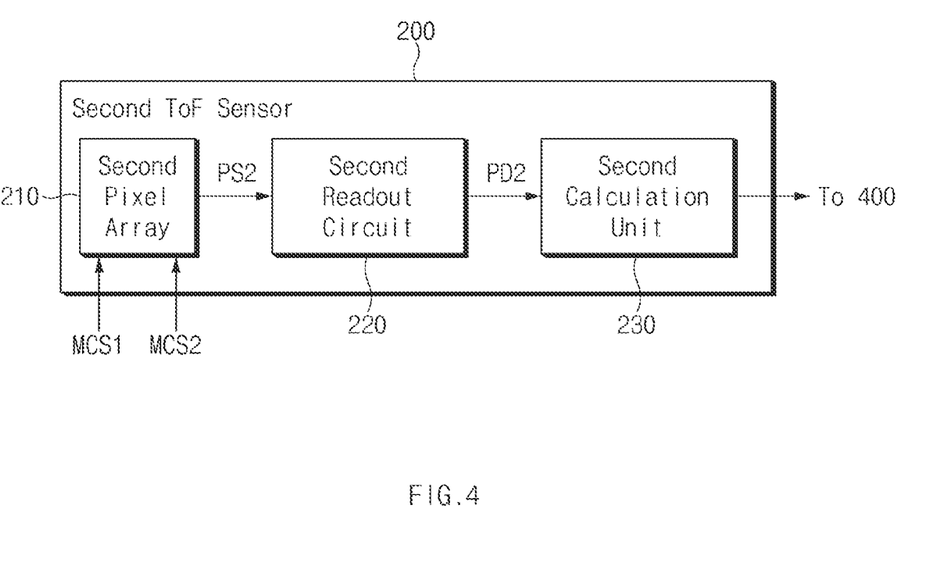
FIG. 4 is a block diagram illustrating an example of a second ToF sensor illustrated in FIG. 1.

FIG. 4 is a block diagram illustrating an example of the second ToF sensor illustrated in FIG. 1. FIG. 5A is a diagram for describing an example of a method in which the second ToF sensor measures the distance to a target object. FIG. 5B is a diagram for describing another example of the method in which the second ToF sensor measures the distance to a target object.

Referring to FIG. 4, the second ToF sensor 200 may include a second pixel array 210, a second readout circuit 220 and a second calculation unit 230.

The second pixel array 210 may include a plurality of second pixels which are successively arranged in a 2D matrix, for example, in column and row directions. Each of the second pixels may generate a second pixel signal PS2 as an electrical signal corresponding to the intensity of the reflected modulated light signal MLS_R by photoelectrically converting the reflected modulated light signal MLS_R received through the lens module (not illustrated), and output the generated second pixel signal PS2 to the second readout circuit 220. At this time, the second pixel signal PS2 may be a signal which indicates not the color of the target object 30 but information corresponding to the distance to the target object 30. Since the lens module (not illustrated) has been described with reference to FIG. 2, the overlapping descriptions will be omitted herein.

In an embodiment, each of the second pixels may be an indirect pixel for the indirect ToF method. For example, each of the second pixels may be a CAPD (Current-Assisted Photonics Demodulation) pixel. However, the scope of the present disclosure is not limited thereto. Different from the pixel construction in the first TOF sensor 100, each of the second pixels in the second pixel array 210 of the second TOF sensor 200 may include a photoelectric conversion element configured to generate and accumulate photocharges corresponding to the intensity of incident light, and two pixel signal circuits rather than one, first and second pixel signal circuits, that are configured to generate the second pixel signals PS2 corresponding to the quantities of photocharges generated at different timings, respectively. For this operation, the first and second pixel signal circuits may receive first and second modulation control signals MCS1 and MCS2, respectively, which are different signals for controlling the timings at which the photocharges are sensed. The first and second modulation control signals MCS1 and MCS2 may be controlled to have different phase values relative to each other in operations, e.g., being exactly out of phase with each other (i.e., a phase difference of 180 degrees from each other). For example, the first and second modulation control signals MCS1 and MCS2 may have a phase difference of 0 degree (i.e. in phase) and a phase difference of 180 degrees from the modulated light signal MLS, respectively. Alternatively, the first and second modulation control signals MCS1 and MCS2 may have a phase difference of 90 degrees (i.e. out of phase by 90 degrees) and a phase difference of 270 degrees from the modulated light signal MLS, respectively.

As shown in the example in FIG. 5A, the first pixel signal circuit for each second pixel in the second TOF sensor 200 may generate the second pixel signal PS2 corresponding to the quantity of photocharges generated in a first period (PR1) in response to the first modulation control signal MCS1, and transmit the generated second pixel signal PS2 to the second readout circuit 220. The second pixel signal circuit may generate the second pixel signal PS2 corresponding to the quantity of photocharges, generated in a second period (PR2) different from the first period (PR1), in response to the second modulation control signal MCS2, and transmit the generated second pixel signal PS2 to the second readout circuit 220.

The second readout circuit 220 may generate second pixel data PD2 as digital data corresponding to the analog second pixel signal PS2 by processing the second pixel signal PS2 outputted from each of the second pixels. For example, the second readout circuit 220 may include an analog-to-digital converter for converting the second pixel signal PS2 into the second pixel data PD2.

The second readout circuit 220 may transmit the second pixel data PD2 to the second calculation unit 230.

The second calculation unit 230 may calculate the phase difference between the modulated light signal MLS and the reflected modulated light signal MLS_R by comparing the second pixel data PD2 obtained by converting the second pixel signals PS2 generated through the first and second pixel signal circuits, respectively, calculate the distance between the target object 30 and the second ToF sensor 200 based on the calculated phase difference, and transmit the calculation result to the image signal processor 400.

FIG. 5A is a timing diagram illustrating an example of how the second ToF sensor 200 measures the distance between the image capturing apparatus and a target object by detecting the MLS_R by the second pixels via MCS1 and MCS2. In an implementation, the second ToF sensor 200 can calculate a distance between the image capturing apparatus and a target object as discussed below.

The example method of FIG. 5A, in which the second ToF sensor 200 calculates a distance, may be defined as a first phase difference sensing method. The first phase difference sensing method may be referred to as a 2-phase modulation method in that it uses modulated signals having two difference phases.

The modulated light signal MLS irradiated while the second ToF sensor 200 is enabled may have a pulse that has a smaller amplitude and a larger pulse width than that of the modulated light signal MLS irradiated while the first ToF sensor 100 is enabled. The reflected modulated light signal MLS_R may have a predetermined phase difference from the modulated light signal MLS due to the time of flight during which the modulated light signal MLS is reflected from the target object 30 and incident on the second ToF sensor 200.

The first modulation control signal MCS1 may be in phase with the modulated light signal MLS (i.e., a phase difference of 0 degree from the modulated light signal MLS), and have an enable voltage (or logic high level) in a first period PR1. The second pixel data PD2 indicating the quantity Q(0) of photocharges generated in the first period PR1 may be generated by the first modulation control signal MCS1 having the enable voltage.

The second modulation control signal MCS2 may be exactly out of phase from the modulated light signal MLS (i.e., a phase difference of 180 degrees from the modulated light signal MLS), and have the enable voltage (or logic high level) in a second period PR2. The second pixel data PD2 indicating the quantity Q($\pi$) of photocharges generated in the second period PR2 may be generated by the second modulation control signal MCS2 having the enable voltage.

Under such timing control by both the controlling the modulation of the MLS via the MLS_R and the detection by the second pixels via MCS1 and MCS2, the reflected modulated light signal MLS_R may be dividedly and separately captured in the time domain in the first period PR1 and the second period PR2.

The second calculation unit 230 may calculate the phase difference $\theta$ according to Equation 1 below, based on the second pixel data PD2 indicating the quantities Q(0) and Q($\pi$) of photocharges captured in the first and second periods PR1 and PR2, and calculate the distance between the second ToF sensor 200 and the target object 30 from the time of flight, which is proportional to the phase difference $\theta$.

$$\theta = \pi \cdot \frac{Q(\pi)}{Q(0) + Q(\pi)} \qquad \text{(Eq. 1)}$$

FIG. 5B is a timing diagram illustrating another example of how the second ToF sensor measures the distance between the image capturing apparatus and a target object by detecting the MLS_R by the second pixels via MCS1 and MCS2.

The example method of FIG. 5B, in which the second ToF sensor 200 calculates a distance, may be defined as a second phase difference sensing method. The second phase difference sensing method may be referred to as a 4-phase modulation method in that it uses modulated signals having four difference phases.

The operation interval in which the second ToF sensor 200 calculates the distance to the target object 30 may be divided into a first sensing period SP1 and a second sensing period SP2 which are sequential.

The modulated light signal MLS and the reflected modulated light signal MLS_R are substantially the same signals as the modulated light signal MLS and the reflected modulated light signal MLS_R, which are illustrated in FIG. 5A, and are based on the assumption that the modulated light signal MLS and the reflected modulated light signal MLS_R have a predetermined phase difference θ. Furthermore, it is assumed that the phase difference θ between the modulated light signal MLS and the reflected modulated light signal MLS_R is constantly maintained in the first sensing period SP1 and the second sensing period SP2.

In the first sensing period SP1, the first modulation control signal MCS1 may be exactly in phase with the modulated light signal MLS (i.e., a phase difference of 0 degree from the modulated light signal MLS), and have an enable voltage (or logic high level) in a first period PR1. The second pixel data PD2 indicating the quantity Q(0) of photocharges generated in the first period PR1 may be generated by the first modulation control signal MCS1 having the enable voltage.

In the first sensing period SP1, the second modulation control signal MCS2 may be exactly out of phase from the modulated light signal MLS (i.e., a phase difference of 180 degrees from the modulated light signal MLS), and have the enable voltage (or logic high level) in a second period PR2. The second pixel data PD2 indicating the quantity Q(π) of photocharges generated in the second period PR2 may be generated by the second modulation control signal MCS2 having the enable voltage.

In the second sensing period SP2, the first modulation control signal MCS1 may have a phase difference of 90 degrees from the modulated light signal MLS, and have the enable voltage (or logic high level) in a third period PR3. The second pixel data PD2 indicating the quantity Q(π/2) of photocharges generated in the third period PR3 may be generated by the first modulation control signal MCS1 having the enable voltage.

In the second sensing period SP2, the second modulation control signal MCS2 may have a phase difference of 270 degrees from the modulated light signal MLS, and have the enable voltage (or logic high level) in a fourth period PR4. The second pixel data PD2 indicating the quantity Q(3π/2) of photocharges generated in the fourth period PR4 may be generated by the second modulation control signal MCS2 having the enable voltage.

That is, the reflected modulated light signal MLS_R may be dividedly and separately captured in the time domain in the first period PR1 and the second period PR2 of the first sensing period SP1, and dividedly and separately captured in in the time domain in the third period PR3 and the fourth period PR4 of the second sensing period SP2. The total quantity of photocharges generated by the reflected modulated light signal MLS_R may be defined as the sum of Q(0) and Q(π) or the sum of Q(π/2) and Q(3π/2).

The absolute value of the difference between Q(0) and Q(π) may be defined as ΔQ(0)(=|Q(0)−Q(π)|), and the absolute value of the difference between Q(π/2) and Q(3π/2) may be defined as ΔQ(π/2)(=|Q(π/2)−Q(3π/2)|). The first modulation control signal MCS1 for acquiring Q(0) and the second modulation control signal MCS2 for acquiring Q(π) may have a phase difference of 90 degrees from the first modulation control signal MCS1 for acquiring Q(π/2) and the second modulation control signal MCS2 for acquiring Q(3π/2), respectively. Therefore, the sum of ΔQ(0) and ΔQ(π/2) may have a constant value (i.e. the total charge).

For the sum of ΔQ(0) and ΔQ(π/2) having a constant value, ΔQ(0) and ΔQ(π/2) may each linearly increase/decrease according to a change in the phase difference θ. That is, as the phase difference θ increases, ΔQ(0) may linearly decrease in the period in which the phase difference θ ranges from 0 to π, and linearly increase in the period in which the differential phase θ ranges from π to 2π. Furthermore, ΔQ(π/2) may linearly increase in the period in which the phase difference θ ranges from 0 to π/2, linearly decrease in the period in which the phase difference θ ranges from π/2 to 3π/2, and linearly increase in the period in which the phase difference θ ranges from 3π/2 to π2. Therefore, based on the ratio relationship between ΔQ(0) to ΔQ(π/2), the phase difference θ may be calculated.

The second calculation unit 230 may calculate ΔQ(0) and ΔQ(π/2) based on the second pixel data PD2 indicating the quantities Q(0), Q(π), Q(π/2) and Q(3π/2) of photocharges captured in the first to fourth periods PR1 to PR4, calculate the phase difference θ according to Equation 2 below, and calculate the distance between the second ToF sensor 200 and the target object 30 from the time of flight which is proportional to the phase difference θ.

$$\theta = \begin{cases} \dfrac{\pi}{2} \cdot \left(1 + \dfrac{-\Delta Q(0)}{|\Delta Q(0)| + \left|\Delta Q\left(\frac{\pi}{2}\right)\right|}\right), & \text{if } \Delta Q\left(\dfrac{\pi}{2}\right) \geq 0 \\ \dfrac{\pi}{2} \cdot \left(3 + \dfrac{+\Delta Q(0)}{|\Delta Q(0)| + \left|\Delta Q\left(\frac{\pi}{2}\right)\right|}\right), & \text{if } \Delta Q\left(\dfrac{\pi}{2}\right) < 0. \end{cases} \quad \text{(Eq. 2)}$$

In particular, the second phase difference sensing method (the 4-phase modulation method) may use differential values such as ΔQ(0) and ΔQ(π/2) when calculating the phase difference. Thus, the second phase difference sensing method may remove background noise components contained in Q(0), Q(π), Q(π/2) and Q(3π/2), respectively, and thus calculate the distance more accurately.

Figure 6:
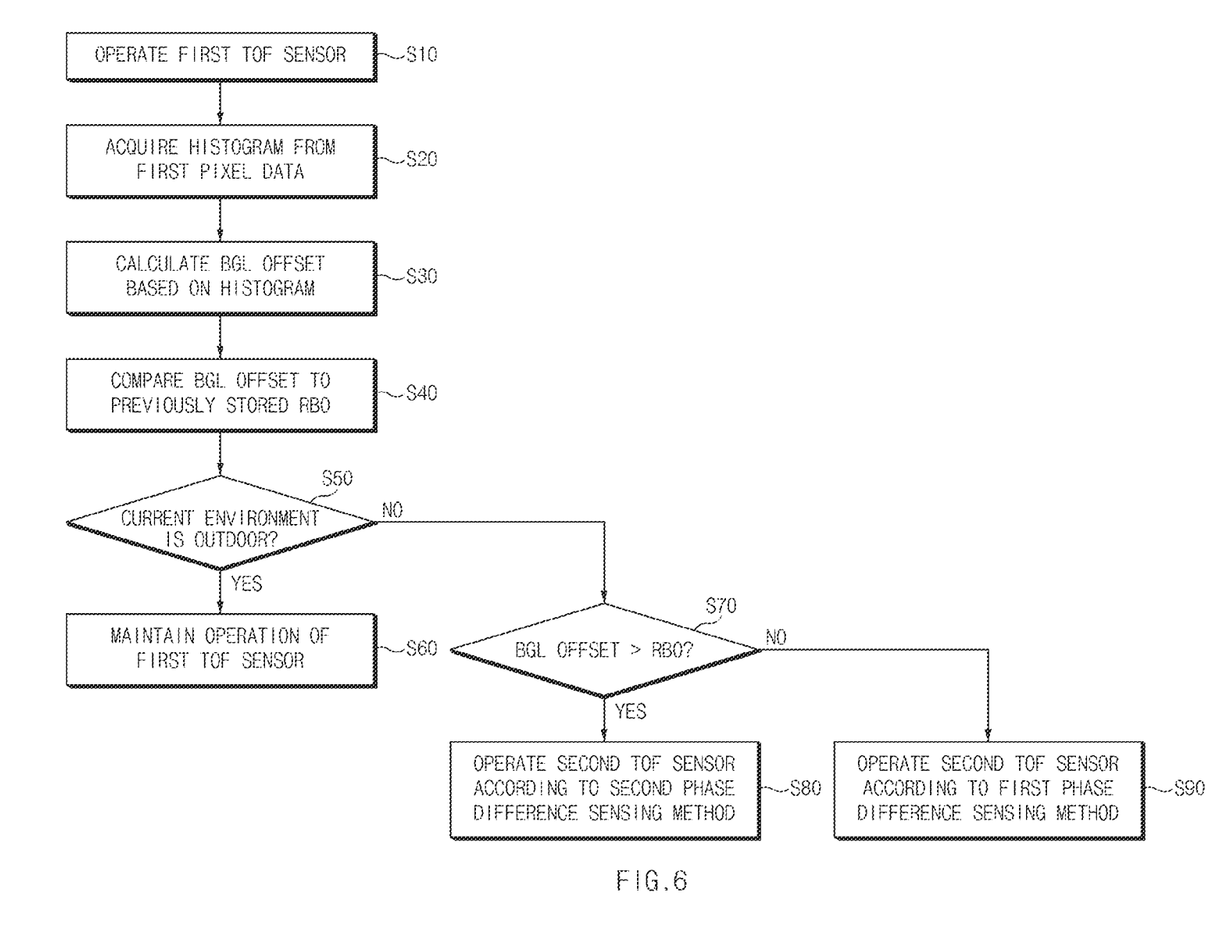
FIG. 6 is a flowchart illustrating an operation method of the image capturing apparatus illustrated in FIG. 1.
Figure 7:
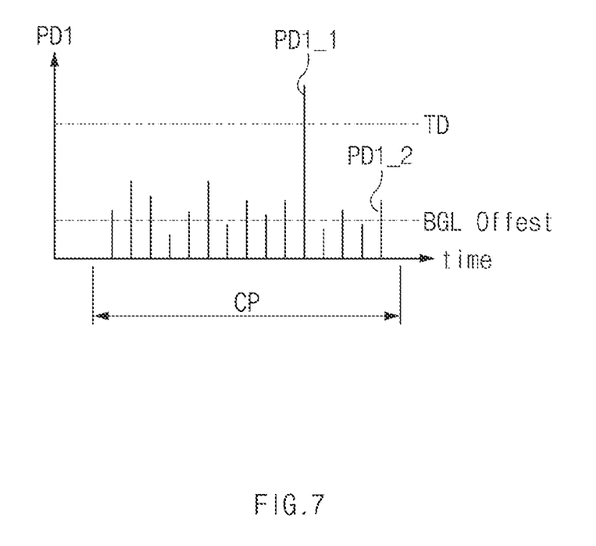
FIG. 7 illustrates an example histogram of first pixel data PD1.
Figure 8:
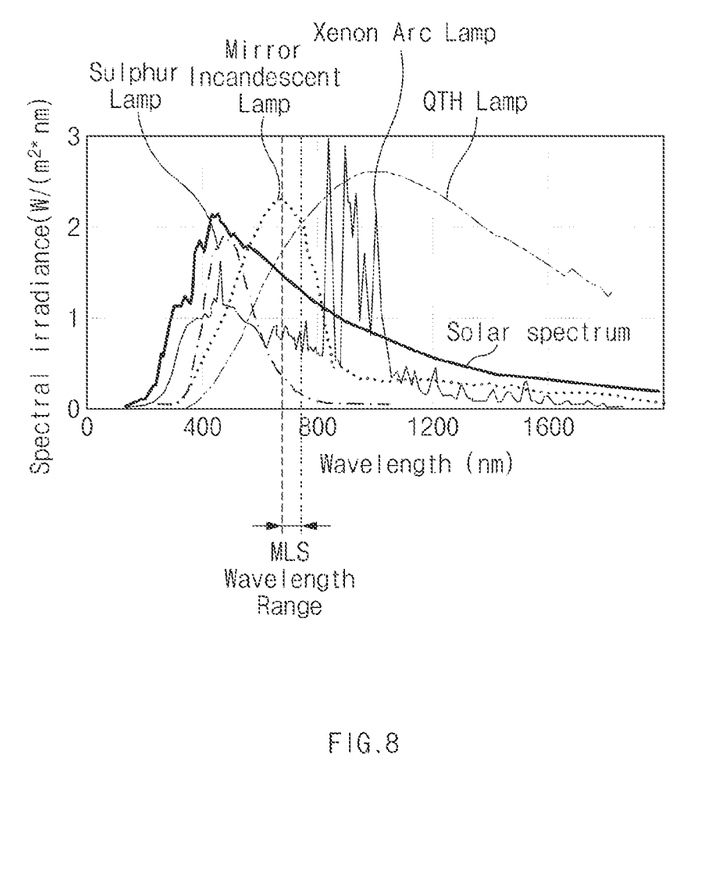
FIG. 8 illustrates spectral irradiances for different light sources.

FIG. 6 is a flowchart illustrating an operation method of the image capturing apparatus illustrated in FIG. 1. FIG. 7 is a graph illustrating an example of a histogram of the first pixel data PD1. FIG. 8 is a graph illustrating spectral irradiance for each light source.

Referring to FIG. 6, when the operation of the image capturing apparatus 10 is started, the initial operation mode may be set to the first operation mode as the default mode. Therefore, the controller 300 may enable the first ToF sensor 100, and disable the second ToF sensor 200. The enabled first ToF sensor 100 may generate the first pixel data PD1 by sensing the reflected modulated light signal MLS_R which is reflected from the target object 30 and incident on the first ToF sensor 100, in step S10. The first pixel data PD1 may indicate data obtained by converting the first pixel signal PS1 of one first pixel included in the first pixel array 110, but the scope of the present disclosure is not limited thereto. In another embodiment, the first pixel data PD1 may indicate the average value of data obtained by converting the first pixel signals PS1 of the first pixels which belong to one row included in the first pixel array 110 or the average value of data obtained by converting the first pixel signals PS1 of the entire first pixels included in the first pixel array 110.

The controller 300 may acquire a histogram of the first pixel data PD1 from the first pixel data PD1 in step S20. The first pixel data PD1 may be periodically generated according to a predetermined period. The histogram of the first pixel data PD1 may be a graph indicating that the sequentially generated first pixel data PD1 are cumulated with the elapse of time.

FIG. 7 illustrates an example histogram of the first pixel data PD1 cumulated with the elapse of time.

The first pixel data PD1 which are sequentially generated during a predetermined cumulative period CP may be cumulated. The first pixel data PD1 may be divided into first pixel data PD1_1 having a value equal to or greater that threshold data TD and first pixel data PD1_2 having a value less than the threshold data TD. The threshold data TD may be experimentally decided in order to determine whether the first pixel data PD1 corresponds to a pulse of the reflected modulated light signal MLS_R. That is, the first pixel data PD1_1 may indicate the intensity of a pulse of the reflected modulated light signal MLS_R, and the first pixel data PD1_2 may indicate the intensity of background light (BGL) incident on the image capturing apparatus 10, not the pulse of the reflected modulated light signal MLS_R.

The controller 300 may calculate a BGL offset based on the histogram of the first pixel data PD1, in step S30. In FIG. 7, the controller 300 may calculate the average value of the first pixel data PD1_2 corresponding to the result obtained by sensing the background light during the cumulative period (CP), and decide the calculated average value as the BGL offset.

The controller 300 may compare the BGL offset (RBO) to the RBO value of sunlight as the BGL, provided from the RBO storage unit 500, in step S40. The RBO of the sunlight may be experimentally decided by collecting the first pixel data PD1 which are generated by the first ToF sensor 100 while the sunlight acts as the background light (BGL) incident on the first ToF sensor 100.

In one implementation of the disclosed ToF technology, the embodiment for determining whether the image capturing apparatus 10 is located outdoor or indoor, based on the RBO of the sunlight, is described. However, the scope of the present disclosure is not limited thereto, but the operation mode of the image capturing apparatus 10 may be changed by determining the surrounding environment of the image capturing apparatus 10 using the RBO of another light source as the background light (BGL).

FIG. 8 illustrates a graph indicating spectral irradiance for each type of light source. The spectral irradiance may indicate a light output density at a specific wavelength (unit: nm), and have a unit of $W/(m^2 * nm)$ (W: watt, m: meter).

FIG. 8 illustrates the spectral irradiances of a solar spectrum, a sulphur lamp, a xenon arc lamp, a QTH (Quartz Tungsten Halogen) lamp and a mirror incandescent lamp, according to a wavelength change.

The average values of the spectral irradiances in the wavelength range MLS Wavelength Range of the modulated light signal MLS may have a relationship of (sulphur lamp<xenon arc lamp<solar spectrum<QTH lamp<mirror incandescent lamp). The wavelength range of the modulated light signal MLS may be a wavelength range corresponding to near infrared ray, but the scope of the present disclosure is not limited thereto. Since the spectral irradiances may each indicate the light output density of the corresponding light source, the RBOs of the respective light sources may be each proportional to the average value of the spectral irradiances of the light sources in the wavelength range of the modulated light signal MLS. That is, the RBOs of the respective light sources may have different values as the average value of the spectral irradiances for the respective light sources is changed, and become data capable of identifying specific light sources.

For example, the RBOs of the sulphur lamp, the xenon arc lamp, the solar spectrum, the QTH lamp and the mirror incandescent lamp may be 20, 60, 100, 130 and 150, respectively. That is, when the first pixel data PD1 generated by the first ToF sensor 100 is similar to 100, background light acting on the first ToF sensor 100 is highly likely to be sunlight. Thus, it may be considered that the image capturing apparatus 10 is located outdoor. On the contrary, when the first pixel data PD1 generated by the first ToF sensor 100 is not similar to 100, the background light acting on the first ToF sensor 100 is highly unlikely to be sunlight. Thus, it may be considered that the image capturing apparatus 10 is located indoor.

The controller 300 may compare a BGL offset to the RBO of sunlight, provided from the RBO storage unit 500, and determine whether the image capturing apparatus 10 is currently located outdoor, depending on whether the BGL offset is included in a predetermined range between a first value (e.g. 85) and a second value (e.g. 115), around the RBO (e.g. 100) of sunlight, in step S50. The first value may be smaller than the RBO and the second value may be greater than the RBO.

When it is determined that the image capturing apparatus 10 is currently located outdoor because the BGL offset is included in the predetermined range (Yes in step S50), the controller 300 may maintain the image capturing apparatus 10 in the first operation mode, and measure the distance to the target object 30 using the first ToF sensor 100, in step S60. This is because, since the first ToF sensor 100 senses the reflected modulated light signal MLS_R having a pulse with a relatively large amplitude and a small pulse width, the interference with sunlight is relatively weak, and the effective measurement distance is relatively large.

When it is determined that the image capturing apparatus 10 is currently located indoor because the BGL offset is not included in the predetermined range (No in step S50), the controller 300 may change the operation mode of the image capturing apparatus 10 to the second operation mode, and measure the distance to the target object 30 using the second ToF sensor 200. This is because, since the second ToF sensor 200 senses the reflected modulated light signal MLS_R having a pulse with a relatively small amplitude and a large pulse width, the interference with sunlight is relatively strong, and the effective measurement distance is relatively small.

When the BGL offset is not included in the predetermined range but is larger than the RBO of sunlight (Yes in step S70), the controller 300 may operate the second ToF sensor 200 according to the second phase difference sensing method, in step S80. This is because, since the image capturing apparatus 10 is located indoor but the background light having relatively high spectral irradiance, such as the QTH lamp or the mirror incandescent lamp, may act on the second ToF sensor 200, it is more advantageous that the second ToF sensor 200 measures the distance to the target object 30 according to the second phase difference sensing method capable of removing background light using differential values.

When the BGL offset is not included in the predetermined range but is smaller than the RBO of sunlight (No in step S70), the controller 300 may operate the second ToF sensor 200 according to the first phase difference sensing method, in step S90. This is because, since the image capturing apparatus 10 is located indoor and the background light having relatively low spectral irradiance, such as the sulphur lamp or the xenon arc lamp, may act on the second ToF sensor 200, it is more advantageous that the second ToF sensor 200 measures the distance to the target object 30 according to the first phase difference detection method having a relatively high operation speed.

It may be assumed that the image capturing apparatus 10 is moved to the outside while the second ToF sensor 200 is used to measure the distance because the image capturing apparatus 10 is located indoor. Alternatively, it may be assumed that the image capturing apparatus 10 is moved to the inside while the first ToF sensor 100 is used to measure the distance because the image capturing apparatus 10 is located outdoor. In this case, the image capturing apparatus 10 may continuously operate in an operation mode which is not suitable for the image capturing environment. In order to prevent such a situation, the controller 300 may perform the process illustrated in FIG. 6 again according to a specific period, a user's request or a request of the image signal processor 400 which has recognized that it is impossible to normally measure the distance from the calculation result of the first or second ToF sensor 100 or 200 (for example, the case in which the calculated distance is repeated as 0 or the effective measurement distance). In particular, when the current operation mode is the second operation mode, the controller 300 may operate the image capturing apparatus 10 in the first operation mode by changing the operation mode of the image capturing apparatus 10, in order to perform the process illustrated in FIG. 6.

In the image capturing apparatus 10 accordance with the present embodiment, the controller 300 may analyze the background light of the image capturing apparatus 10, and operate the image capturing apparatus 10 in the optimal operation mode according to the analysis result.

While various embodiments have been described above, it will be understood to those skilled in the art that the embodiments described are examples only. Variations and improvements of the disclosed embodiments and other embodiments may be made based on what is described or illustrated in this patent document.

What is claimed is:

1. An image capturing apparatus comprising:
a first time of flight (ToF) sensor configured to include first photosensing pixels to detect a modulated light signal and configured to process pixel signals from the first photosensing pixels to calculate a distance to a target object using a time difference between a reference pulse time at which the modulated light signal is irradiated to the target object and a pulse sensing time at which a reflected modulated light signal, reflected from the target object and incident thereon, is sensed by the first photosensing pixels;
a second ToF sensor configured to include second photosensing pixels to detect the modulated light signal and configured to process pixel signals from the second photosensing pixels to calculate the distance to the target object using a phase difference between the modulated light signal and the reflected modulated light signal; and
a controller coupled to the first and second ToF sensors and configured to enable one of the first and second ToF sensors for sensing the modulated light signal, based on first pixel data which the first ToF sensor generates in sensing the reflected modulated light signal,
wherein the controller calculates a background light (BGL) offset which is caused by background light received by the first ToF sensor, and which indicates a level of the background light, based on a histogram obtained by accumulating the first pixel data, and enables one of the first and second ToF sensors for sensing the modulated light signal by comparing the BGL offset and a previously stored reference BGL offset.

2. The image capturing apparatus of claim 1, wherein the controller calculates the BGL offset by calculating the average value of the first pixel data having a value less than threshold data in the histogram.

3. The image capturing apparatus of claim 1, wherein the reference BGL offset is decided based on first pixel data which is generated while background light acting on the first ToF sensor is sunlight.

4. The image capturing apparatus of claim 1, wherein the reference BGL offset is proportional to the spectral irradiance of sunlight.

5. The image capturing apparatus of claim 1, wherein when the BGL offset is included in a predetermined range between a first value and a second value, the controller enables the first ToF sensor, and
wherein the first value is smaller than the reference BGL offset and the second value is greater than the reference BGL offset.

6. The image capturing apparatus of claim 1, wherein when the BGL offset is not included in a predetermined range between a first value and a second value, the controller enables the second ToF sensor, and
wherein the first value is smaller than the reference BGL offset and the second value is greater than the reference BGL offset.

7. The image capturing apparatus of claim 6, wherein when the BGL offset is larger than the reference BGL offset while the BGL offset is not included in the predetermined range, the controller operates the second ToF sensor using modulated signals having four different phases.

8. The image capturing apparatus of claim 6, wherein when the BGL offset is smaller than the reference BGL offset while the BGL offset is not included in the predetermined range, the controller operates the second ToF sensor using modulated signals having two different phases.

9. The image capturing apparatus of claim 1, wherein the first ToF sensor comprises:
a first pixel array comprising a plurality of first pixels each configured to generate a first pixel signal as an electric signal corresponding to the intensity of the reflected modulated light signal;
a first readout circuit configured to generate the first pixel data by converting the first pixel signal into digital data; and
a first calculation unit configured to decide, as the pulse sensing time, a point of time that the first pixel data has a value equal to or greater than threshold data, and calculate the distance to the target object using the time difference between the reference pulse time and the pulse sensing time.

10. The image capturing apparatus of claim 9, wherein the plurality of first pixels are each an Single-Photon Avalanche Diode (SPAD) pixel.

11. The image capturing apparatus of claim 1, wherein the second ToF sensor comprises:
a second pixel array comprising a plurality of second pixels each configured to generate a second pixel signal as an electric signal corresponding to the intensity of the reflected modulated light signal in response to a first modulation control signal and a second modulation control signal which have different phases;
a second readout circuit configured to generate second pixel data by converting the second pixel signal into digital data; and a second calculation unit configured to calculate the phase difference by comparing the second pixel data generated in response to the first modulation control signal to the second pixel data generated in response to the second modulation control signal, and calculate the distance to the target object using the phase difference.

12. The image capturing apparatus of claim 11, wherein the plurality of second pixels are each a Current-Assisted Photonics Demodulation (CAPD) pixel.

13. The image capturing apparatus of claim 1, wherein the modulated light signal irradiated while the first ToF sensor is enabled for sensing the modulated light signal has a larger amplitude than an amplitude of the modulated light signal irradiated while the second ToF sensor is enabled for sensing the modulated light signal,
wherein the modulated light signal irradiated while the first ToF sensor is enabled has a smaller pulse width than a pulse width of the modulated light signal irradiated while the second ToF sensor is enabled for sensing the modulated light signal.

14. An image capturing apparatus comprising:
a Reference Background-light Offset (RBO) storage unit configured to store a reference BGL offset generated based on pixel data generated using sunlight as background light; and
a controller configured to select one of a first operation mode and a second operation mode, using the reference BGL offset,
wherein the first operation mode is a mode for calculating the distance to a target object, using a time difference between a modulated light signal irradiated onto a target object and a reflected modulated light signal which is reflected from the target object and incident on the image capturing apparatus, and
the second operation mode is a mode for calculating the distance to the target object, using a phase difference between the modulated light signal and the reflected modulated light signal.

* * * * *